United States Patent

Thoms et al.

[11] Patent Number: 6,098,262
[45] Date of Patent: Aug. 8, 2000

[54] PROCESS FOR MANUFACTURING A HOLLOW BODY FROM TWO METAL BARS

[75] Inventors: Volker Thoms, Calw; Andreas Poellmann, Herrenberg, both of Germany

[73] Assignee: DaimlerChrysler AG, Stuttgart, Germany

[21] Appl. No.: 09/161,591

[22] Filed: Sep. 28, 1998

[30] Foreign Application Priority Data

Sep. 26, 1997 [DE] Germany .......................... 197 42 444

[51] Int. Cl.$^7$ ...................................... B23P 17/00
[52] U.S. Cl. ...................... 29/421.1; 29/897; 29/897.2; 29/423; 228/157
[58] Field of Search ................... 29/421.1, 897.2, 29/469.3, 463, 423; 219/121.64, 121.14; 228/157, 160

[56] References Cited

FOREIGN PATENT DOCUMENTS 900 085  12/1953  Germany .
195 35 870
       A1  2/1997  Germany .

OTHER PUBLICATIONS

European Search Report.

*Primary Examiner*—Irene Cuda
*Assistant Examiner*—Trinh T. Nguyen
*Attorney, Agent, or Firm*—Evenson, McKeown, Edwards & Lenahan, P.L.L.C.

[57] ABSTRACT

A process for manufacturing a hollow body made of two mutually welded together metal bars which are flatly disposed on one another. Within an internal high-pressure forming tool in a closed position, the metal bars are widened by introducing a pressure fluid under a high pressure into the parting line existing between the metal bars, until they are placed on the die sinking of the forming tool defining the final contour while forming the hollow body. The metal bar composite is trimmed by a cutting operation, and the pressure fluid inlet area of the metal bar composite is cut off after the widening has taken place. In order to reliably manufacture a flangeless hollow body in a simple manner from two metal bars, the metal bars are seam-welded before entering into the forming tool, and the resulting metal bar composite is then trimmed by a beam welding process in the weld seam. Then for the expanding forming, the metal bar composite is charged into the forming tool such that its trimmed edges are situated within the die sinking of the forming tool, with the metal bar composite being clamped in only in the area of the pressure fluid inlet.

8 Claims, 4 Drawing Sheets

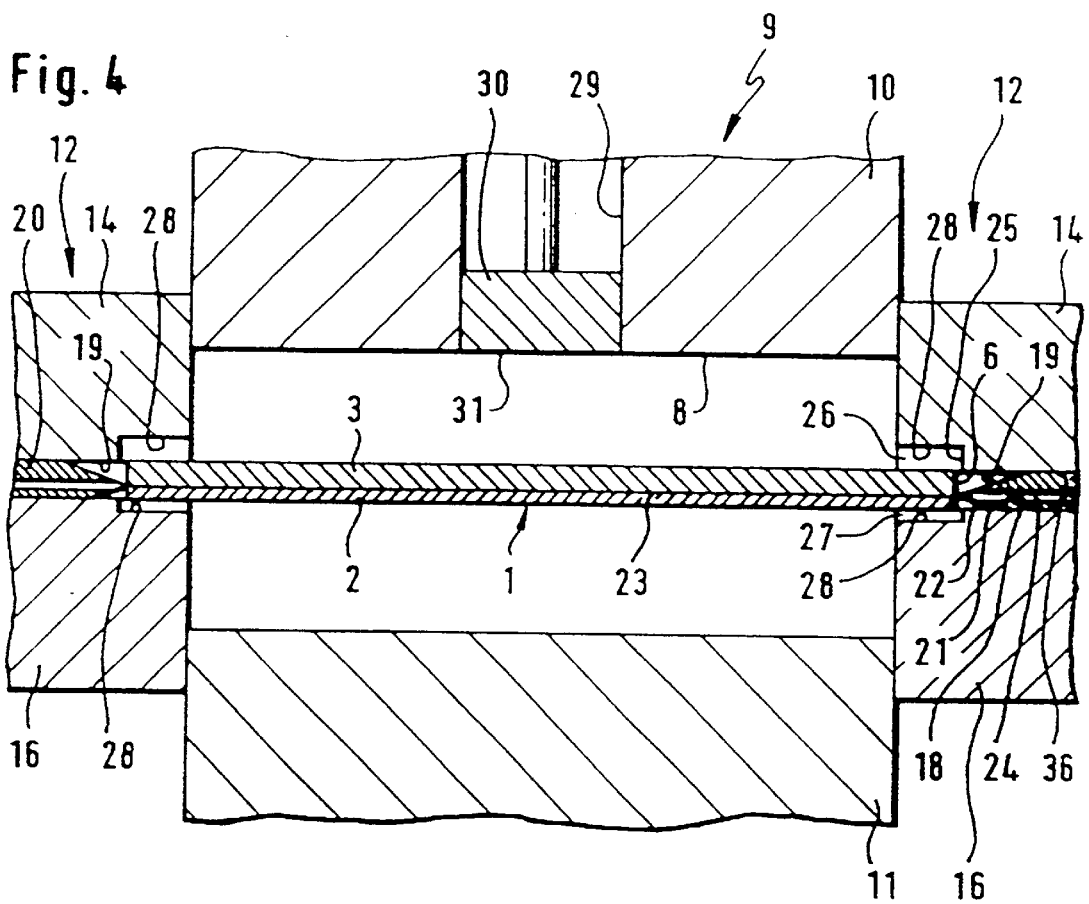
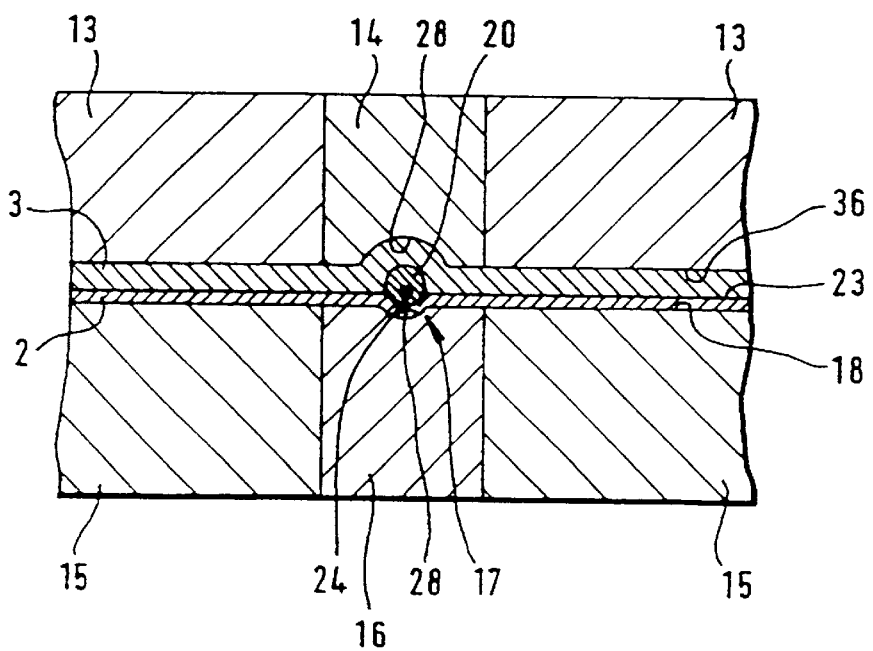

PROCESS FOR MANUFACTURING A HOLLOW BODY FROM TWO METAL BARS

BACKGROUND OF THE INVENTION

This application claims the priority of German application 197 42 444.9-14, filed in Germany on Sep. 26, 1997, the disclosure of which is expressly incorporated by reference herein.

The present invention relates to a process for manufacturing a hollow body from two metal bars, and more particularly to a process in which the metal bars are flatly disposed on one another, comprising the steps of introducing high pressure fluid within a closed internal high-pressure forming tool into a parting line between the metal bars; widening the metal bars until they are placed on a die sinking contour of the forming tool defining a final shape of the hollow body, while they form the hollow body; welding the metal bars to one another by beam welding in a welding-through; trimming the thus-formed metal bar composite by a cutting operation; and cutting off a fluid inlet area of the metal bar composite after the widening.

DE 195 35 870 A1 describes a process in which two flat sheet metal blanks are placed on one another and are clamped in an internal high-pressure tool between the top tool and the bottom tool. After the closing of the forming tool, a pressure fluid is guided under high pressure into the parting line, after which the blanks (bars) expand and are placed corresponding to the contours against the die sinking of the forming tool. After the expansion, the bars are laser-welded to one another in the clamped state. Subsequently, the pressure fluid is relaxed and is guided out of the forming tool; the bar composite is removed from the forming tool and is then, on the side of the weld seam facing away from the expansion, trimmed by a laser cutting tool. The pressure fluid inlet area is also cut off. Finally, in its end form, the thus-produced oblong hollow body has a flange on both longitudinal sides which extends along these sides.

The flange produced in this known process is very disadvantageous for the further installation or mounting of the hollow body, for example, as a part of a frame structure of a motor vehicle body in terms of the space-frame technology because of the required installation space. A cutting-off of the flange is not useful because the hollow body will disintegrate into two half shells which can then be connected at high expenditures and with the loss of the desired overall structure. Thus, manufacturing of a flangeless hollow body cannot take place in a secure manner.

SUMMARY OF THE INVENTION

An object of the present invention is to provide an improved process such in that a flangeless hollow body can be produced from two metal bars in a simple manner and reliably.

According to the present invention, this object has been achieved by a process in which, before the entering into the forming tool, the metal bars are seam-welded and the resulting plate composite is then trimmed by a beam cutting process in the weld seam, and then the metal bar composite is charged for an expanding forming into the forming tool such that trimming edges thereof carrying one portion of the weld-through seam are situated within the die sinking of the forming tool, the metal bar composite being clamped in only in the area of the pressure fluid inlet.

As the result of the preparatory process steps before the metal bar composite is expanded to a hollow body and the exclusive clamping of the composite in the pressure fluid inlet area, the remaining portion of the composite can be positioned in the area within the die sinking without being clamped between the forming tool halves. As a result, a flange formation is placed in a targeted manner on the area of the pressure fluid inlet which is cut off anyhow from the hollow body following the expansion after the removal of the hollow body from the forming tool. A subsequent cutting-off of other flanges for receiving a desired contour of the hollow body by way of which this hollow body becomes installable and the resulting disintegration into several parts is eliminated so that the reliable manufacturing of a flangeless hollow body is ensured.

Furthermore, the expansion to the hollow body takes place in a reliable manner because the seam, which was beam-welded as the result of a through-welding of the two bars, has such a high quality that, even in the event of high mechanical stress, particularly in the case of the tensile load caused during the expanding of the metal bars, the seam also remains stable without any afterflowing of material from the clamped-in area. Because of the elimination of flanges caused by the clamping-in, with the exception of those or of that of the pressure inlet area, a high-expenditure control of the locking pressure of the forming tool, which permits an afterflow of the metal bar material in the direction of the die sinking to the desired degree, can be eliminated. Also, the sealing problems for the forming tool which are connected with a circumferentially extensive clamping-in of the metal bars are considerably reduced.

Other objects, advantages and novel features of the present invention will become apparent from the following detailed description of the invention when considered in conjunction with the accompanying drawings.

BRIEF DESCRIPTION OF THE DRAWINGS

FIG. 4 is a side sectional view of an internal high-pressure forming tool with an inserted welded-together and trimmed metal bar composite according to FIGS. 1 and 3 in the clamped-in position;

FIG. 5 is a cross-sectional view of the clamping-in of the metal bar composite of FIG. 4 with the pressure fluid inlet mandrel pushed into the parting line of the metal bars;

DETAILED DESCRIPTION OF THE DRAWINGS

Figure 1:
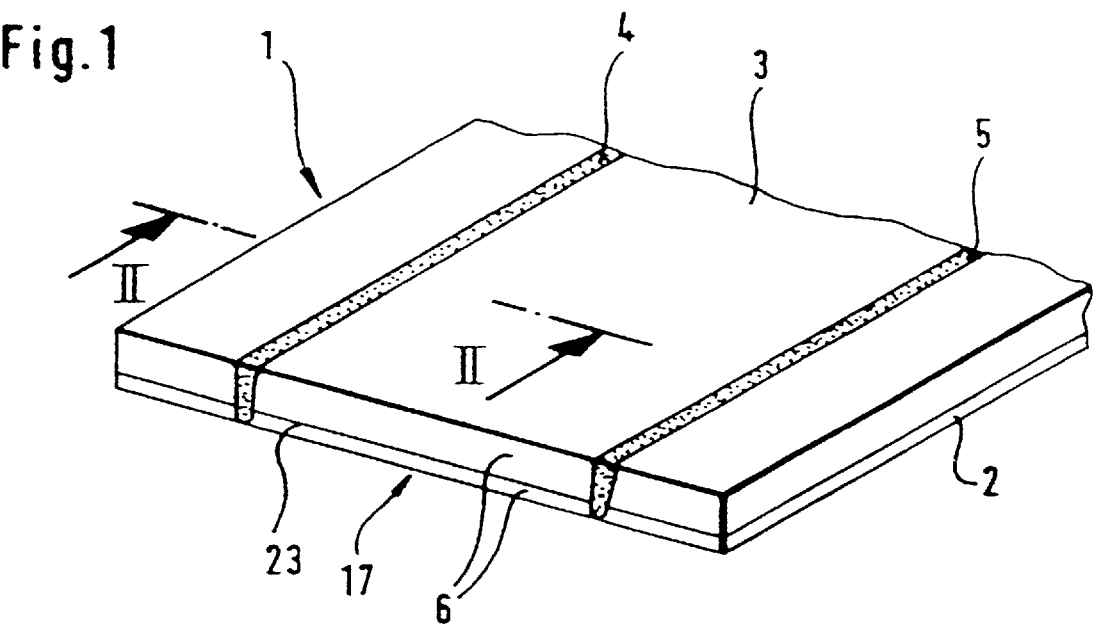
FIG. 1 is a perspective partial view of a metal bar composite made of two metal bars welded together according to the present invention.
Figure 2:
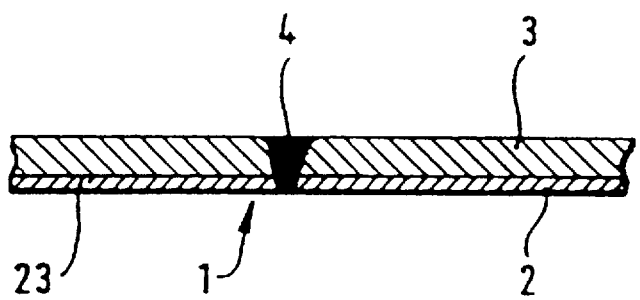
FIG. 2 is a sectional view along line II—II of the metal bar composite of FIG. 1.

FIG. 1 illustrates a metal bar composite 1 which consists of a lower metal plate bar 2 and of an upper metal plate bar 3. The upper metal bar 3 has a thicker wall thickness than the lower metal bar and may consist of a more ductile material than the lower metal bar 2. Metal bars 2, 3 have an even construction and are flatly disposed on one another. The metal bars 2, 3 are welded to one another by a beam welding process, for example, by laser beam welding or electron beam welding, such that, as also illustrated in FIG. 2, the upper metal bar 3 is welded through. The welding is implemented such that two longitudinal seams 4, 5 are created which are spaced from one another, are parallel and are very narrow in their width. These longitudinal seams 4 and 5 end on both sides on the end edges 6 of the metal bars 2, 3.

Because of the beam welding, the longitudinal seams 4, 5 are of high quality, are tight with respect to high fluid pressure and can be very stressed mechanically without an occurrence of a failure. Before the welding-together, the metal bars 2, 3 can also be preformed such before the welding-together that they widen approximately in the center between the weld seams 4, 5 in a wide gap which, on one hand, results in a lowering of the forming degree for the later expanding operation and, on the other hand, facilitates the introduction of the pressure fluid into the gap for the internal high-pressure widening.

Figure 3:
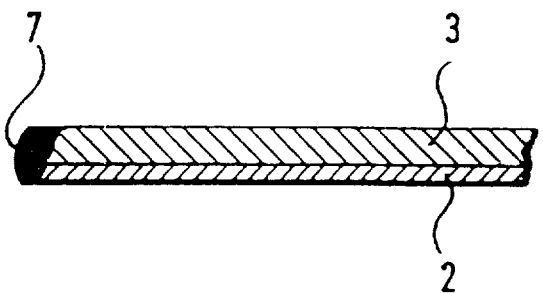
FIG. 3 is a view of a cutout of the metal bar composite according to FIG. 2 after the trimming of the composite.

The metal bar composite 1 is now trimmed in the weld seams 4, 5 by a beam cutting process, preferably by laser beam welding, in which case the beam cutting operation is used because of the narrowness of the longitudinal seams 4, 5. As the result, the weld seams 4, 5 are separated such that the trimming edge 7 forming according to FIG. 3 carries over half of the respective seam 4, 5, whereby the metal bars 2, 3 still remain completely welded to one another without any loss of durability. The cutting operation takes place such that the trimming edge 7 is rounded by start melting.

Figure 6:
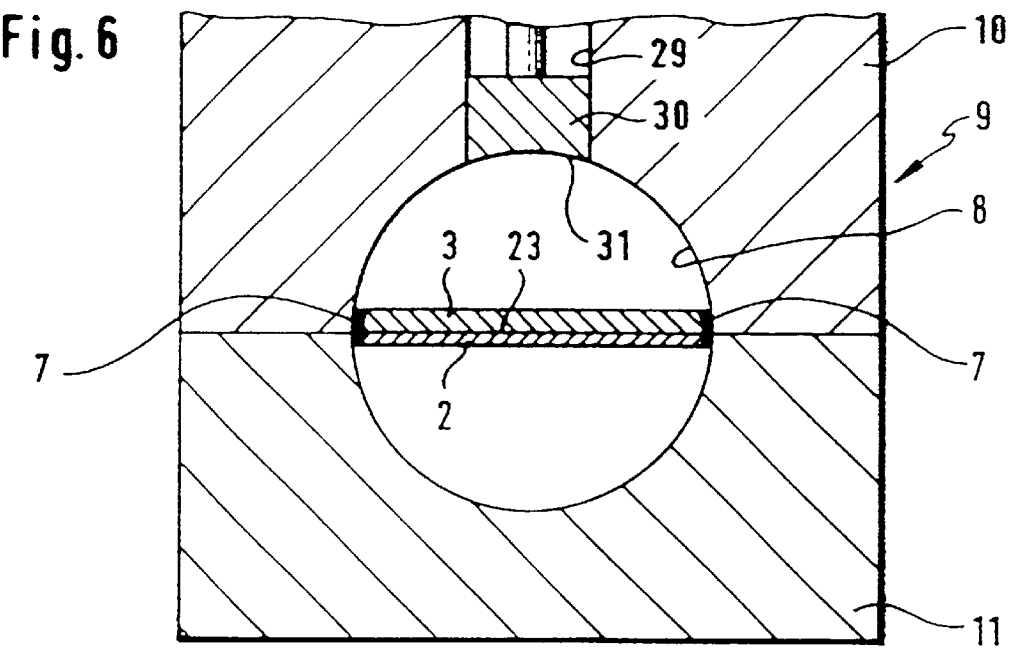
FIG. 6 is a cross-sectional view of the internal high-pressure forming tool of FIG. 4 with an inserted welded-together and trimmed metal bar composite of FIGS. 1 and 3.

According to FIGS. 4 to 6, the metal bar composite 1 is placed in the die sinking 8 of an internal high-pressure forming tool 9 having a top tool 10 and of a bottom tool 11. Axially approximately in the center, the metal bar composite 1 penetrates the die sinking 8 provided with a circular cross-section, in which, because of the trimming taking place in the weld seam 4, 5 before the widening process, the trimmed edges 7 come to be situated within the die sinking as seen in FIG. 6. The parting plane of the forming tool 9 is coplanar with the parting line 23 of the metal bars 2, 3.

In the area of the two end edges 6, the metal bar composite 1 is clamped into a clamping-in tool 12 which rests against the forming tool 9 in a manner which is high-pressure tight with respect to fluid as seen in FIG. 4. The clamping-in tool 12 contains upper clamping jaws 13, 14 and lower clamping jaws 15, 16. The clamping jaws 14, 16 reach around the pressure inlet area 17 of the metal bar composite 1, and the clamping jaws 13 and 15, which adjoin the clamping jaws 14, 16, clamp in the metal bar composite 1 as seen in FIG. 5. Longitudinal grooves, which are in the same position, are worked into the mutually facing parting planes 36, 18, which longitudinal grooves in the clamping-in position, forming a passage 19 with one another in which a pressure lance 20 is displaceably guided.

At its end 21 facing the die sinking, the pressure lance 20 is in the form of a chisel. The tip 22 of the chisel is situated in the parting plane 23 of the metal bars 2, 3, and is aimed at the parting line 23 of the metal bars 2, 3. A pressure fluid duct 24, which, on one side, leads out in the tip 22 and, on the other side, is connected with a high-pressure fluid generating system, extends in the pressure lance 20. In the direction of the die sinking 8, the passage 19 widens in a step 25 with a circular-segment-shaped cross-section. The step 25 and thus the resulting upper gap 26 and lower gap 27 between the metal bar 2 or 3 and the passage wall 28 situated there are dimensioned in their width maximally equal to the wall thickness of the respective gap-limiting sheet metal bar 2, 3.

A branching 29, in which a die-type counterholder 30 is displaceably guided, originates from the die sinking 8. The upper thicker metal bar 2 faces this branching 29, and the arrangement of the metal bar composite 1 in the forming tool is coordinated such that the weld seams 4, 5 are situated outside the area of the branching 29. This arrangement is advantageous for the later widening since, after the placing of the metal bar material onto the die sinking 8 for the dome formation of the metal bar 3 into the branching 29, the weld seams 4, 5 must withstand no significant strain which is advantageous with respect to the reliability of the widening process and, on the whole, for the manufacturing of a hollow body with a dome-type secondary form element 32.

After the clamping-in of the metal bar composite 1, the pressure lance 20 is moved onto the parting line 23 of the metal bars 2, 3 as seen in FIG. 4 and is then rammed into these at a high force, whereby the metal bar material which is acted upon there is displaced into the gap 26, 27 as seen in FIG. 5. Thus, the pressure lance 20 is coupled to the metal bar composite 1 in a high-pressure-tight manner. By way of the duct 24 of the pressure lance 20, a pressure fluid is then guided at a high pressure between the metal bars 2,3, whereby these expand radially and are placed on the die sinking 8 corresponding to the contour. During this widening operation, the counterholder 30 closes off flush with the contour of the die sinking by its face 31 corresponding to its position in the clamping phase as seen in FIG. 6.

The rounding of the trimmed edges 7 of the metal bar composite 1 prevents the weld seams 4, 5 from being bent so that a buckling-caused crack of the seams 4, 5 cannot occur. Furthermore, a soft placement against the die sinking 8 of the forming tool 9 is caused by the rounding so that no notching in the die sinking 8 can occur as the result of the sharped-edged condition of the trimmed edges 7, whereby the durability of the tool 9 is increased. With a moderate forming pressure, because of the tilting of the trimmed edges 7 as the result of the widening on the outer contour 33 of the formed hollow body 34, sink marks 35 are created in the weld seam area, as illustrated in FIG. 8. These sink marks 35, which may impair the uniformity of the desired outer contour and therefore may require a refinishing operation by dressing, can be flattened and filled in a simple manner by calibrating the hollow body 34 at an increased forming pressure so that a hollow body 34 can be manufactured which is illustrated in FIG. 7.

Figure 7:
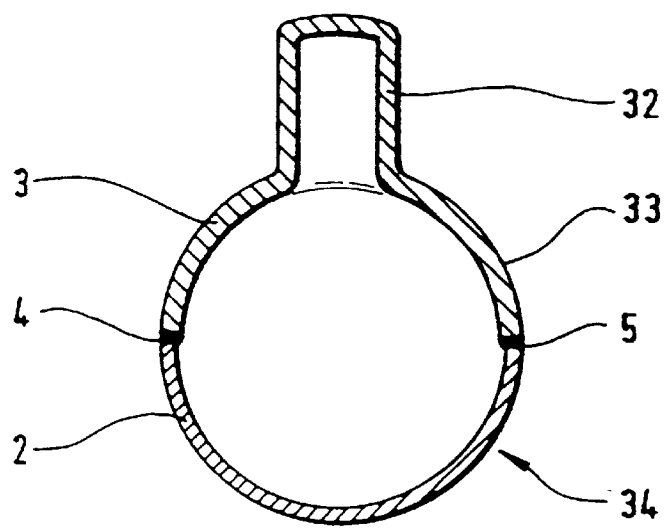
FIG. 7 is a cross-sectional view of a hollow body manufactured according to the process of the present invention and calibrated by internal high pressure.
Figure 8:
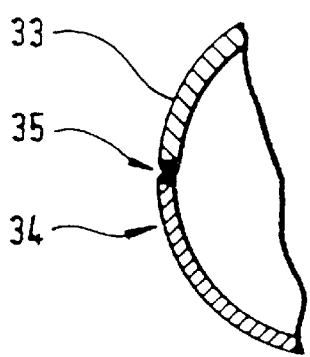
FIG. 8 is a cross-sectional view of a cutout of the hollow body of FIG. 7 before the calibration.

After the metal bars 2, 3 have been placed against the die sinking 8, the counterholder 30 escapes in a controlled manner to the outside, whereby a dome-type secondary form element 32 is shaped as illustrated in FIG. 7. In order to permit the manufacturing of secondary form elements 32 of a larger height in a reliable manner with respect to the process, the upper metal bar 3 facing the branching 29 is constructed with a correspondingly thick wall so that a sufficient amount of metal bar material is available for the dome formation without the occurrence of a thinning of the material of the secondary form element 32 which result in a bursting of the hollow body 34. Instead of a suitable configuration of the wall thickness of the metal bar 3, a construction of the metal bar 3 is also contemplated, with the same wall thickness as the metal bar 2, which is of a more ductile material than that of the lower metal bar 2 on which lower demands are made in this embodiment with respect to its thickness and ductility because of the forming degrees which are comparatively lower for its forming area in the lower half of the die sinking 8. It is clear that the highest forming degrees are achieved in a reliable manner with respect to the process by means of a thick metal bar 3 of a high ductility.

Alternatively, the use of "tailored blanks" is advantageously contemplated for this purpose, whereby the metal bar 3 consists of three mutually welded metal sheets, of which the central metal sheet has the increased thickness and/or increased ductility which is required for the high forming degree and is arranged in the area of the branching 29 within the die sinking 8. For reducing the mechanical tensile stress for ensuring a reliable process, however, these weld seams should also be situated outside the area of the branching 29. The use of the "tailored blanks" allows the metal bar 3 to be optimally adapted to the point of the high forming degree in a tailored manner with respect to the thickness, the type of material and the position, in the case of which the metal sheet which is intended for the reliable forming at higher forming degrees is locally limited in its dimensions to the branching area. This approach permits an intelligent light construction in a reliable manner with respect to the process, so that the areas of a lower forming degree are constructed of light-metal sheets, which, like an aluminum alloy sheet, essentially have only a slight breaking elongation, whereas, only for the area of the dome formation, thus for the area with higher forming degrees, a metal sheet is used which is made of a ductile steel, such as St14.

This process can be used in the vehicle body construction of motor vehicles in particular a hollow-profile side member which consists of an aluminum alloy or of a magnesium alloy and which is connected with the A-column, the B-column and the C-column of the vehicle body frame by way of a frame node. Because of its one-piece connection with the side member, this frame node is an integral component of the side member, wherein for a useful fastening, e.g., by a gluing-on or welding-on of the respective column to the side member, the branching of the frame node or the dome formation originating radially from the longitudinal course of the side member must be drawn out as far as possible. This can then be achieved in a reliable manner by a metal sheet made of a correspondingly ductile steel as a section of the overall metal bar 3 of the metal bar composite 1 in this area, which metal bar is welded together of several metal sheets. Furthermore, inner contours on the hollow body 34 can also be produced by the process. For this purpose, the die sinking 8 has correspondingly contoured elevations or dies of a correspondingly displaceable face which are guided in the forming tool 9 and can be displaced into the die sinking 8, which are pressed into the widening metal bar material.

Figure 9:
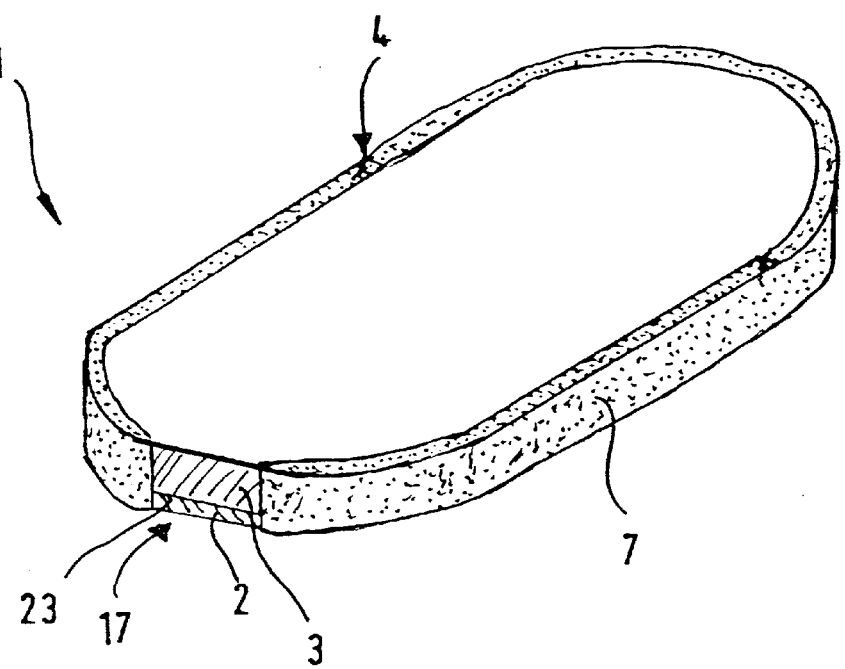
FIG. 9 is a perspective view of another embodiment in which the seam welding takes place in a closed curve.

Furthermore, the seam welding of the two metal bars 2 and 3 can take place in a closed curve as seen in FIG. 9. Thereby, during the subsequent trimming on the welded-together metal bar composite 1, the weld seam is cut off on a section while exposing the parting line 23 of the metal bars 2, 3, which section forms the area 17 of the pressure fluid inlet for the later shaping-out. In this manner, bulging flangeless hollow bodies can be produced in reliable manner which have only one mouth opening, and thus the clamping-in in the area of the pressure fluid inlet is only one-sided. Likewise, it is contemplated that the seam welding starts out from the end edge 6 of the metal bar composite 1, extends in a continuous bent curve and ends on the end edge 6 but spaced away from the starting point which saves the above-mentioned process step of the cutting-off of a section of the weld seam. The area 17 of the pressure inlet will then be situated between the starting point and the end point of the weld seam on the end edge.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for manufacturing a hollow body from two flat metal bars disposed on one another, comprising: seam-welding the metal bars with a parting line defined therebetween to produce a plate composite; trimming the plate composite by beam cutting a seam-welded area thereof to produce trimmed edges; charging the plate composite into a high pressure forming tool such that the trimmed edges are situated within a die sinking of the forming tool; closing the forming tool to clamp the plate composite only in an area of a pressure fluid inlet of the forming tool; introducing high pressure fluid through the pressure fluid inlet into a parting line between the metal bars; widening the metal bars of the plate composite until they are conformed to a contour of the die sinking; and then cutting off a fluid inlet area of the plate composite after the widening.

2. Process according to claim 1, wherein the trimming comprises beam cutting with a laser such that the trimmed edge is melted into a rounded shape.

3. Process according to claim 1, wherein the step of widening further comprises calibrating the hollow body at a fluid pressure which is increased with respect to pressure used in the widening of the metal bars to produce complete conformation with the die sinking contour.

4. Process according to claim 1, wherein, for manufacturing of the hollow body with an additional contour, charging of the metal bars into the forming tools comprises situating the seam-welded area in the forming tool at a location other than a portion of the die sinking which is shaped to produce the additional contour.

5. Process according to claim 1, wherein one of the metal bars consists of a plurality of metal sheets made of the same material but of a different thickness which are welded to one another, whereby during the charging of the plate composite into the forming tool, a larger thickness of the one metal bar is located opposite a branched area of the die sinking, which branched area forms an additional contour to be produced in the hollow body, and with the seam-welded area being situated in the forming tool at a location other than the branched area.

6. Process according to claim 1, wherein one of the metal bars consists of a plurality of welded metal sheets of materials with different ductilities welded, whereby during the charging of plate composite into the forming tool, a portion of the one metal bar consisting of more ductile material is located opposite a branched area of the die sinking, which branched area forms an additional contour to be produced on the hollow body, with the seam welded area being situated in the forming tool at a location other than the branched area.

7. Process according to claim 1, wherein the step of seam-welding further comprises producing parallel weld seams which end at edges of the metal bars, and introducing the high pressure fluid into the unwelded parting line of the metal bars for shaping-out.

8. Process according to claim 1, wherein the seam welding occurs in a closed curve, and the trimming comprises cutting of the the seam welded area to expose a parting line of the metal bars and an area of the pressure fluid inlet.

\* \* \* \* \*